United States Patent [19]

Holmström

[11] Patent Number: 5,001,319
[45] Date of Patent: Mar. 19, 1991

[54] ARRANGEMENT FOR CONTINUOUS INDUCTION WELDING

[75] Inventor: Gert Holmström, Lund, Sweden

[73] Assignee: Tetra Pak Holdings & Finance S.A., Pully, Switzerland

[21] Appl. No.: 476,738

[22] Filed: Feb. 8, 1990

[30] Foreign Application Priority Data

Mar. 13, 1989 [SE] Sweden .................................. 8900874

[51] Int. Cl.⁵ .............................................. H05B 6/10
[52] U.S. Cl. ........................... 219/10.61 R; 219/10.53; 219/10.71; 219/10.73; 219/10.79; 156/274.2; 156/380.2
[58] Field of Search ................ 219/10.53, 10.71, 10.69, 219/10.61 R, 10.491, 10.492, 10.61 A, 10.73, 10.75, 10.79; 156/274.2, 380.2

[56] References Cited

U.S. PATENT DOCUMENTS

| | | |
|---|---|---|
| 2,708,704 | 5/1955 | Duda, Jr. .......................... 219/10.79 |
| 2,790,055 | 4/1957 | Van Iperen ....................... 219/10.79 |
| 3,038,055 | 6/1962 | Ross .................................. 219/10.79 |
| 3,395,261 | 7/1968 | Leatherman et al. ........ 219/10.61 R |
| 3,764,767 | 10/1973 | Randolph ........................ 219/10.491 |
| 4,694,134 | 9/1987 | Ross .................................. 219/10.79 |

Primary Examiner—Philip H. Leung
Attorney, Agent, or Firm—Burns, Doane, Swecker & Mathis

[57] ABSTRACT

The invention relates to an inductive heating apparatus for carrying out a continuous weld along a moving web of laminated packing material (8). The apparatus includes two similar elongated metal plates (1) with two slots (2, 12). The metal plates (1) are arranged at some distance from one another and are connected electrically to one another and to an a.c. source (10). The laminated packing material (8) which is to be welded together is advanced between the two plates (1). Within the plates (1), pressure rollers (6) are arranged in a recess (5).

24 Claims, 2 Drawing Sheets

ARRANGEMENT FOR CONTINUOUS INDUCTION WELDING

FIELD OF THE INVENTION

The present invention relates to continuous induction welding and more particularly to continuous induction welding of laminated packing materials.

BACKGROUND OF THE INVENTION

The welding of laminated packing material by means of induction heat is used in the packaging industry. One example of such a laminated material is a carrier layer of paper and cardboard, aluminium foil and thermoplastic coatings along the inner and outer surfaces of the laminate.

The technique of induction welding is based on the fact that the magnetic field around a conductor, generated by an alternating current is capable of inducing a current in an adjoining electrically conducting material, which depending on the resistance of the material, brings about a more or less pronounced warming up of the material. Thus in induction welding an inductor loop or coil of the same configuration as that which the desired weld is to receive is fitted adjoining the laminate containing the aluminium foil, whereupon the laminate is pressed together with the material to which it is to be joined. The aluminium foil is heated in a pattern corresponding to the coil by means of appropriately chosen current, frequency and processing period. The material can be heated to a temperature which is high enough to seal adjoining layers of thermoplastic, causing the combined thermoplastic layers to fuse together, thus producing a tight and durable seal.

A modern method for manufacturing liquid packages includes a plane plastic-coated web which is formed to a tube in a filling machine. The tube is filled with contents and sealed off along separate, narrow zones located at right angles to the longitudinal direction of the tube. It is customary in this context to use induction welding for the transverse welds which divide the packing material tube 2 into individual packages.

In the manufacture of a continuous pipe or tube from a plane packing material web, edge zones of the web are overlapped. The overlapping edge zones are combined by heating and surface fusion.

A customary method for forming continuous pipes or tubes from a plane web consists in carrying out the welding together of the overlapped edge zones, the so-called longitudinal joint weld, with the help of hot air. The combined thermoplastic layers are heated to sealing temperature, and pressed together while being cooled at the same time. Often, one edge zone is provided with a narrow strip of thermoplastic which is welded first to one edge zone of the material web before the two edge zones are brought together for the purpose of forming a continuous tube. A joint is obtained towards the inside of the package which is wholly covered by thermoplastic. Otherwise, one edge of the joint is open towards the interior of the package, which means that the carrier layer of paper or cardboard of the packing laminate makes direct contact with the contents. The contents can penetrate into the carrier layer and dissolve the paper fibres. Likewise, the welding of the thermoplastic strip is generally carried out with hot air in a manner similar to that of the longitudinal joint.

This method, however, involves a relatively long warming up period for the filling machine, in order to heat the hot-air element. Furthermore, it is necessary at short production stops in the filling machine to reheat the joint in order to obtain a continuous longitudinal joint without interruption. Such an arrangement requires a great number of movable parts in order to make the process fully automatic. For example, the pressure roller presses together the joint has to be turned away and a separate heating element has to heat the area underneath the pressure roller.

SUMMARY OF THE INVENTION

It is an object of the present invention to provide an arrangement to enable a continuous weld on a laminated packing material to be carried out by means of induction heat.

It is a further object of the present invention to reduce the heating up time for the machine and to avoid the inconveniences of a reheating associated with a short production stop.

These and other objects have been achieved in accordance with the invention in that a system for continuously welding laminated packing materials includes an inductor with at least one inductor plate of metal in which has a first groove or slot, extending along most of the length of the inductor plate. The groove or slot is located asymmetrically with respect to the width of the plate. The inductor plate also has a second slot which extends from the first slot to one of the outer edges of the plate.

DETAILED DESCRIPTION

Figure 1:
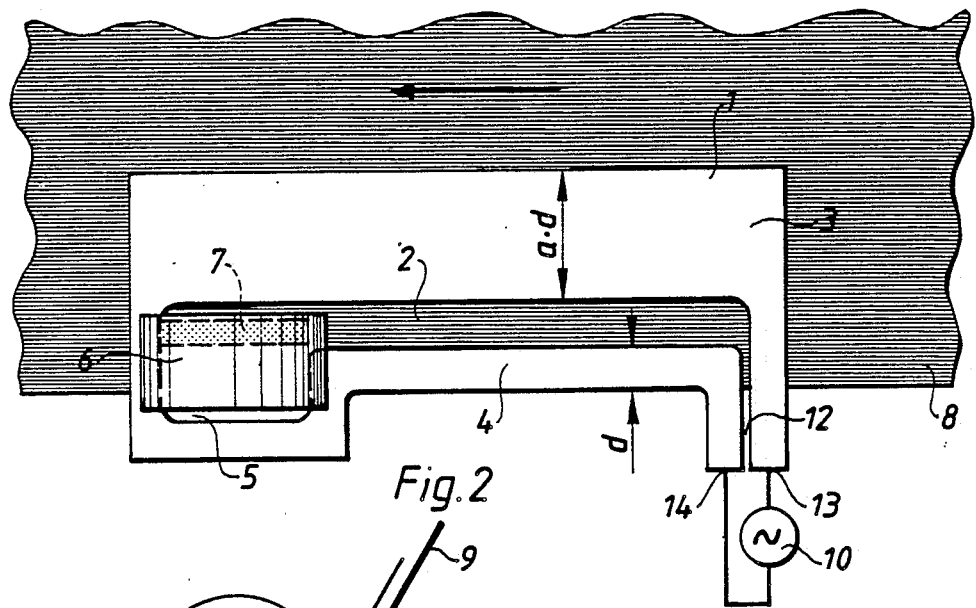
FIG. 1 is a plan view of the present invention.
Figure 2:
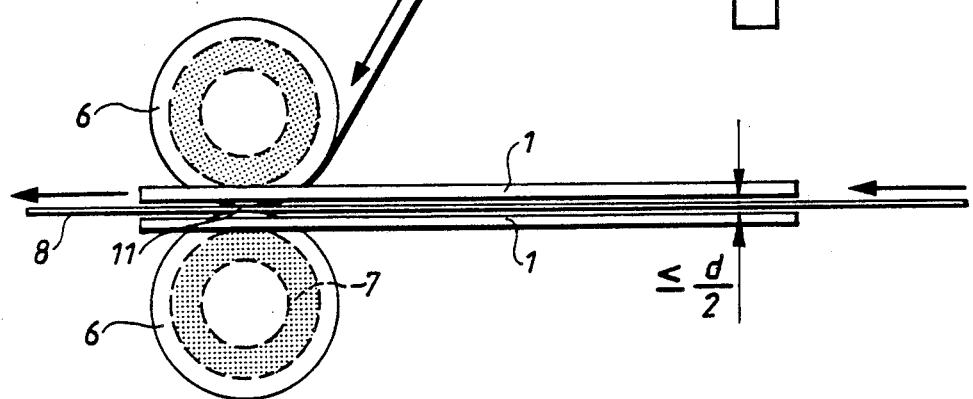
FIG. 2 is a side view of the present invention.

FIGS. 1 and 2 show two elongated metal plates 1 of substantially identical shape, placed at some distance from one another. Incorporated in the metal plates which constitute an inductor is a first groove or a slot 2 which extends along the main part of the length of the metal plate 1. The groove 2 is located asymmetrically on the width of the plate 1. The plates may be replaced by metal wires or metal strips placed densely adjoining one another or at some distance from one another and designed so as to cover a surface corresponding to the metal plates.

In the preferred embodiment, the groove 2 divides the plate 1 into a narrow part 4 and a wide part 3 where the wide part 3 is more than three times wider than the narrow part 4 which has a width equal to d. In applications where it is not feasible to provide a part 3 which is three times as wide owing to lack of space, it is possible to make the wide part 3 approximately 2 times wider than the narrow part 4. In this case, however, an increased heating of the packing material 8 under the wide part 3 results. The distance between the two inductor plates 1 should be chosen so that a good inductive coupling to the intermediate packing material 8 is achieved. In FIG. 2 the distance has been chosen so that it is half or less than half the width d.

The length of the metal plates 1 is chosen appropriately so that they constitute at least one cutoff length. The cutoff length equals the distance between two transverse joints of the packing material 8. More uniform heating is obtained because the relatively long plate 1 assists in evening out the differences in heating caused by differences in speed when the packing material 8 moves through the packing apparatus.

In the end of the inductor plates 1, located downstream from the direction of movement of the packing material 8, a wider recess 5 is incorporated. In this recess 5 are placed one or more pressure rollers 6 within the heating area of the inductor. The pressure rollers 6 are manufactured from some electrically insulating material and have concentrically inserted rings 7 of ferrite.

The plate 1 also includes a second slot 12, which connects the first slot 2 to one of the edges of the plate 1, so that the two sides which delimit the second slot 12 are electrically insulated from one another. Consequently, a current can be conducted through the plate 1 by connecting a point 13 on one side of the second slot 12 to one outlet on an a.c. source 10 and connecting the second outlet of the a.c. source to a point 14 on the other side of the slot 12.

FIG. 2 shows how a strip 9 of thermoplastic is introduced into the arrangement and is welded to the inductively heated packing material edge 8. The pressure rollers 6 ensure that good adhesion will result from the welding process.

Figure 3:
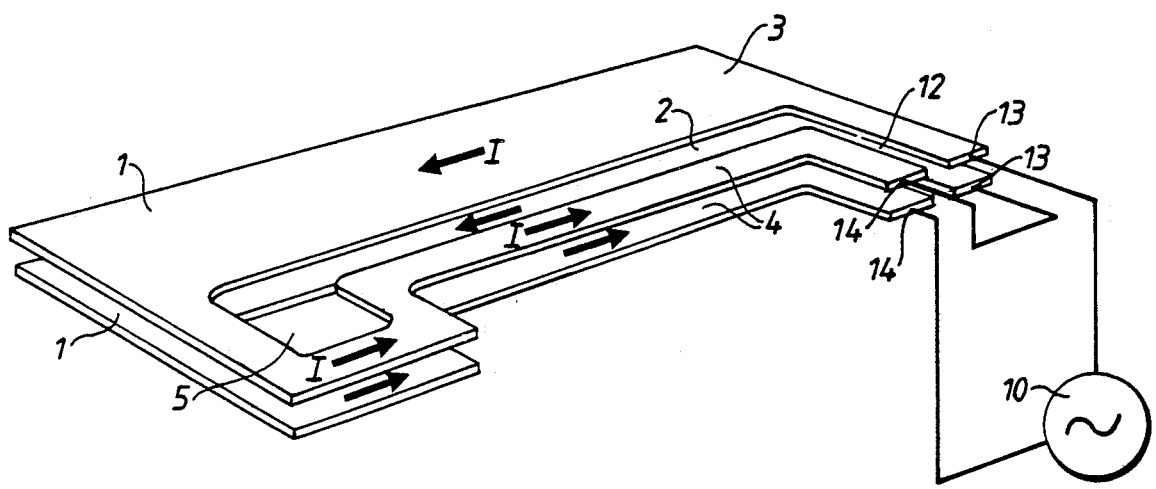
FIG. 3 is a perspective view of the plates of the present invention.

FIG. 3 shows how the two plates 1 are connected to an a.c. source, a so-called IH generator, from which a constant power can be obtained, which can be controlled for an optimum welding process. The heat loss in the metal plates 1 is relatively small so that the problem regarding heat emission to the environment is negligible. This means also that the whole arrangement can be placed in the filling machine without having to consider a diversion of the waste heat.

The two inductor plates 1 are connected to one another so that they constitute two coils connected in series. As a result the same direction of current exists in both inductor plates 1. An induced current is obtained in the intermediate packing material 8, even if it were to "flutter", i.e. vary vertically during its movement through the plates.

The current induced in the intermediate material 8 has approximately the same spread and density distribution as in the inductor plates 1. If the groove 2 of the plates 1 divides the plate 1 into a narrow part 4 having width d and a wide part 3 having width, a·d, where a in accordance with the above preferred embodiment=3, the following power factor can be calculated:

We assume that the packing material 8 in the narrow part 4 has the resistance R. The resistance in the wide part 3 then will be R/a. If the short sides are neglected in the calculation, the total power developed $P_{tot}$ in the packing material 8 will be $$P_{tot} = I^2(R + R/a).$$

The development of power in the two parts can be compared by means of the following calculations:

$$\frac{P_{narrow}}{P_{tot}} \approx \frac{I^2 R}{I^2(R + R/a)} = \frac{a}{a+1}, \text{ if } a = 3, \tfrac{3}{4}$$

$$\frac{P_{wide}}{P_{tot}} \approx \frac{I^2 R/a}{I^2(R + R/a)} = \frac{1}{a+1}, \text{ if } a = 3, \tfrac{3}{4}$$

With such a distribution on the inductor plates 1, the power obtained in the narrow part 4 thus is three times that in the wide part 3.

The heating in the intermediate material 8 underneath the wide part 3 of the inductor plate 1 is calculated then by noting that the power ratio is equal to (a) and the wide branch 3 has a mass which is (a) times as great. The heating ratio becomes $a^2$, so that in the preferred embodiment the heating ratio = $3^2 = 9$. The heating in the narrow part 4 thus will be 9 times as great as that in the wide part 3.

In practice this indicates that the material 8 which passes underneath the narrow part 4 of the inductor plates 1 is heated to such an extent that the thermoplastic melts and can be welded together with the other edge or with a thermoplastic strip 9. In the material 8 which passes underneath the wide part 3, a current is induced which is barely able to warm up the material 8.

In the recess 5, wherein are arranged the pressure rollers 6, the current fed in follows the shape of the plate 1 and deviates consequently from the packing material edge 8. The current induced in the packing material 8 endeavours to follow the plate 1 as closely as possible, and an induced current is obtained therefore also underneath the pressure rollers 6 up to the far end of the groove 5.

The pressure rollers 6 are made substantially of an electrically insulating material, with concentrically inserted rings 7 of ferrite, and where the electrically insulating material concentrically surrounds the ferrite rings 7. The ferrite ring 7 being axially displaced on the axle of the pressure roller 6 assists in a control of the induced current along the material edge 8 in spite of the plates 1 not being directly above and underneath the material edge 8. In FIG. 1, the ferrite ring 7 is placed so that it is located substantially in the extension the groove 2.

When there is a need for any reason to make short production stops on the filling machine, the welding is carried out up to the point of contact 11 of the pressure rollers 6. Because induction welding furnishes a direct start-up without a preheating period and the material 8 is also heated underneath the pressure roller 6 when the machine is restarted, no part of the longitudinal joint will remain unsealed.

Figure 4:
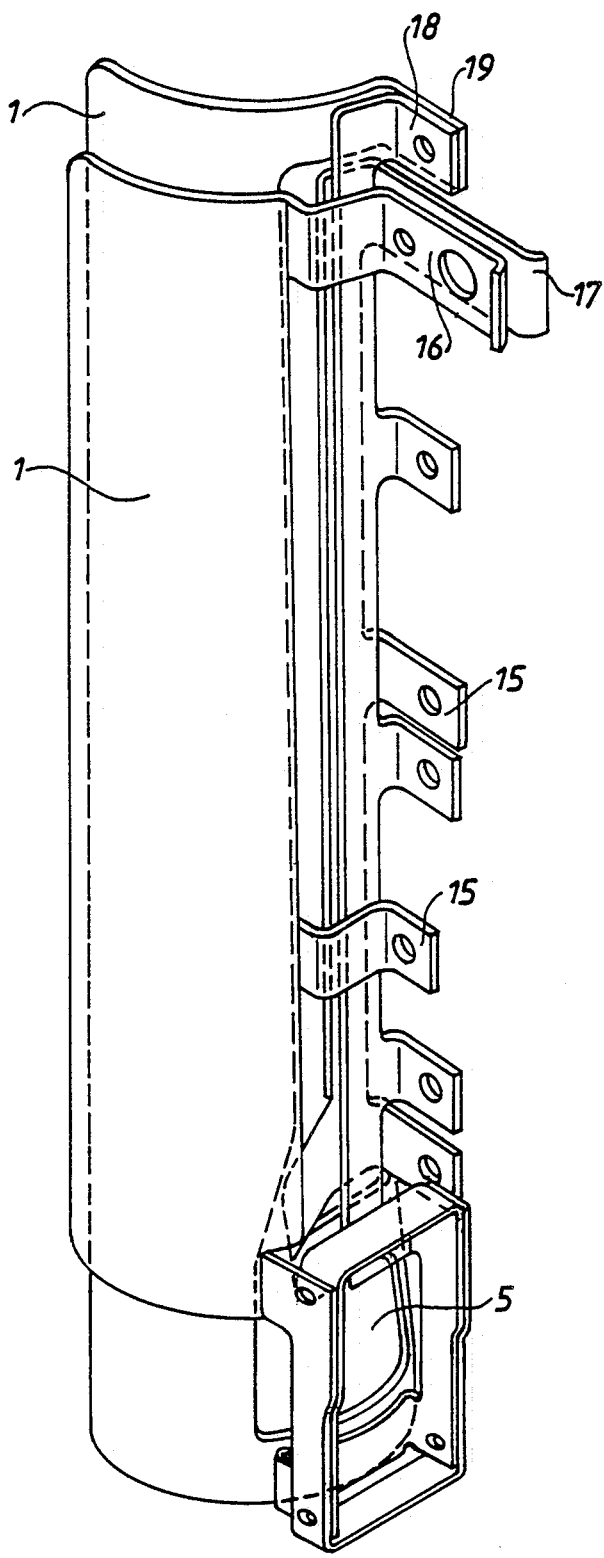
FIG. 4 is a side view showing the welding of a continuous tube according to the present invention.

FIG. 4 illustrates an apparatus for sealing a continuous tube by means of induction heat. The apparatus consists, as in FIG. 1, of two substantially elongated metal plates 1, slightly bent to facilitate the forming of the tube. The different legs for attachment 15 and current feeding 16 and 17 are insulated from one another e.g. by means of an insulating plate which at the same time constitutes a fixing means for the whole arrangement. For greater clarity, the insulating plate has not been displayed in FIG. 4.

Figure 5:
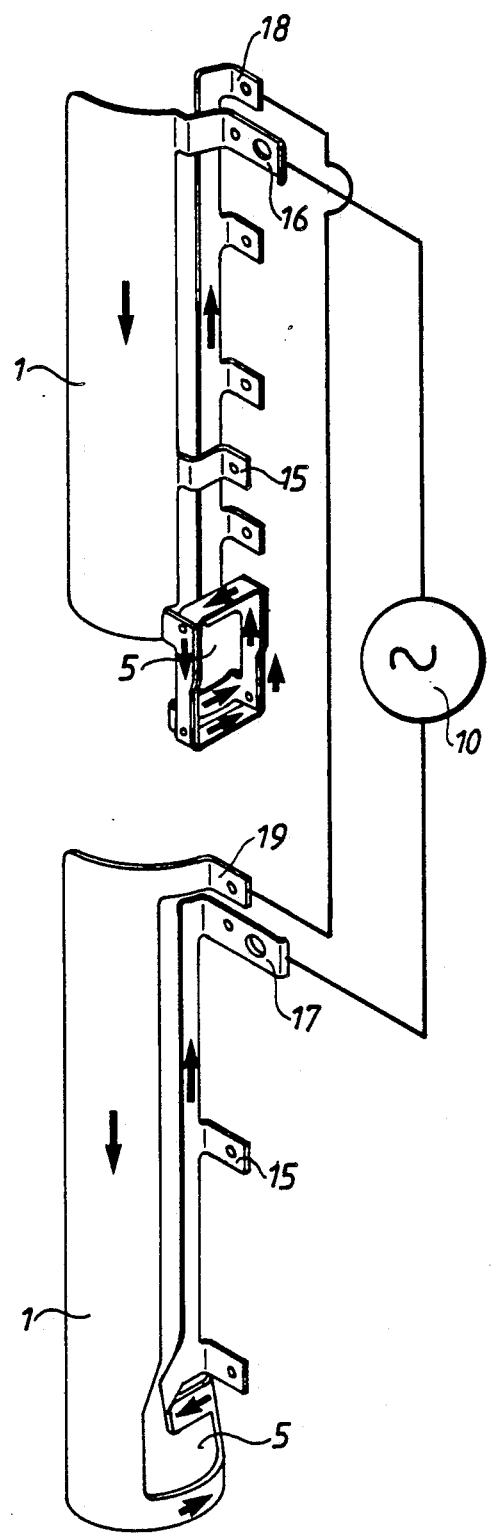
FIG. 5 is a schematic showing the electrical connections between various components shown in FIG. 4.

Only the legs 18 and 19 are electrically connected to one another, which is also illustrated in FIG. 5. The current feed legs 16 and 17 are connected to the IH generator 10 which furnishes alternating current to the arrangement.

In a corresponding manner to that in the plane arrangement in FIG. 1–3, one or more pressure rollers 6 are arranged within the inductor plates 1 in a recess 5. The metal round the recess 5 in this embodiment has been formed so that it constitutes a coil with a number of turns in order to augment the induced current underneath the pressure roller 6, so that the ready-sealed longitudinal joint at no point can be weaker and thereby cause leakages in the finished packages.

As is evident from the foregoing description, the present invention makes possible an apparatus for the continuous welding of a moving packing material web by means of induction heat. The apparatus requires no warming-up period and does not disturb the environment through waste heat.

The apparatus also allows in case of short stops to obtain a continuous weld without having to adopt solutions requiring extra heating elements and mechanical or movement of the pressure roller.

While this invention has been illustrated and described in accordance with a preferred embodiment, it is recognized that variations and changes may be made therein without departing from the invention as set forth in the claims.

What is claimed is:

1. An apparatus for the continuous induction welding along a moving web of laminated packing material including a metal layer and surface coatings of thermoplastic material, comprising:
    an inductor including a plurality of plates;
    means for supplying current to said inductor;
    a first slot in each of said inductor plates extending substantially along the length of said inductor plates and located asymmetrically with respect to the width of said plates; and
    a second slot in each of said inductor plates connecting said first slot to an outer edge of said plates.

2. An apparatus for continuous induction welding in accordance with claim 1, wherein said inductor includes two parallel inductor plates having similar shape and size, said parallel plates spaced from one another and electrically connected to one another in series.

3. An apparatus for continuous induction welding in accordance with claim 2, wherein said first slot divides said inductor plates into a wide portion and a narrow portion such that said wide portion is at least three times wider than said narrow portion.

4. An apparatus for continuous induction welding in accordance with claim 3, wherein the distance between said two parallel inductor plates is less than half the width of said narrow portion.

5. An apparatus for continuous induction welding in accordance with claim 4, further comprising:
    means for moving said web between said two parallel inductor plates such that a part of said web to be welded moves parallel with and along said narrow portion of said inductor plates.

6. An apparatus for continuous induction welding in accordance with claim 2, wherein said two parallel inductor plates are curved in order to facilitate formation and sealing of a continuous tube.

7. An apparatus for continuous induction welding in accordance with claim 1, wherein at least one pressure roller is arranged within said inductor.

8. An apparatus for continuous induction welding in accordance with claim 7, wherein said at least one pressure roller is manufactured substantially from an electrically insulating material which concentrically surrounds a ferrite ring.

9. An apparatus for the continuous welding of a moving web of laminated packing material, comprising:
    a first conductive plate including a first longitudinal slot extending substantially along the length of said plate and dividing said first plate into first and second conductors;
    a second conductive plate including a second longitudinal slot extending substantially along the length of said second plate and dividing said second plate into third and fourth conductors,
    an AC current source; and
    means for connecting said AC power source to said first and fourth conductors, said first, second, third, and fourth conductors being sequentially connected in series,
    said first and second plates being oriented to align said first and second longitudinal slots and said first and third conductors having a lesser resistance than said second and fourth conductors, whereby packing material moving between said first and second plates is welded between said second and fourth conductors.

10. An apparatus as defined in claim 9, wherein power dissipated in said second and fourth conductors is greater than power dissipated in said first and third conductors.

11. An apparatus as defined in claim 9, wherein said first and second plates have a uniform thickness.

12. An apparatus as defined in claim 11, wherein said first and second longitudinal slots are located asymmetrically with respect to the width of said first and second plates, respectively, said first and third conductors being wider than said second and fourth conductors.

13. An apparatus as defined in claim 9, wherein said first and third conductors define a wide portion of said first and second plates, respectively, and said second and fourth conductors define a narrow portion of said first and second plates, respectively, such that said wide portion is at least three times wider than said narrow portion.

14. An apparatus as defined in claim 13, wherein a distance between said plates is less than or equal to one half of the width of said narrow portion.

15. An apparatus as defined in claim 14, further comprising:
    a third slot in said plates for housing plural pressure rollers for moving said web between said plates such that said edge of said packing material moves parallel with and between said second and fourth conductors.

16. An apparatus as defined in claim 9, wherein said plates are oriented in parallel.

17. An apparatus as defined in claim 9, further comprising:
    means for moving said web between said parallel plates such that a part of said packing material to be welded moves parallel with and between said second and fourth conductors.

18. An apparatus as defined in claim 17, wherein said part is an edge of said packing material.

19. An apparatus as defined in claim 17, wherein said moving means includes plural pressure rollers arranged within a second slot in said plates.

20. An apparatus as defined in claim 19, wherein said pressure rollers include an electrical insulator that surrounds a ferrite ring.

21. An apparatus as defined in claim 19, wherein said metal is aluminum.

22. An apparatus as defined in claim 9, wherein said laminated packing material includes a metal layer and surface coatings of thermoplastic material.

23. An apparatus as defined in claim 9, wherein said plates are curved in order to facilitate formation and welding of a continuous tube.

24. An apparatus for continuous induction welding along a moving web of laminated packing material including a metal layer and surface coatings of thermoplastic material, comprising:

an inductor having two parallel, conductive plates of uniform thickness, each plate including a longitudinal slot extending substantially along the length of each plate and located asymmetrically with respect to the width of said plates to form a narrow conductor and a wide conductor, said wide conductor being three times as wide as said narrow conductor and having a greater conductivity than said narrow conductor, and a transverse slot connecting said first slot to an outer edge of each plate, wherein said longitudinal and transverse slots of each plate are aligned;

an AC power source;

means for electrically connecting said power source in series with said conductive plates, wherein packing material moving between said two plates is sufficiently heated between said narrow portions of each plate to weld an edge of said packing material and said packing material moving between said wide portions of each plate is only minimally heated.

* * * * *